United States Patent [19]

Kaetzel

[11] 4,395,868
[45] Aug. 2, 1983

[54] HAYMAKING MACHINE

[75] Inventor: Pierre Kaetzel, Saverne, France

[73] Assignee: Belrecolt S.A., Marmoutier, France

[21] Appl. No.: 340,523

[22] Filed: Jan. 18, 1982

Related U.S. Application Data

[60] Continuation of Ser. No. 146,198, Apr. 30, 1980, abandoned, which is a division of Ser. No. 950,260, Oct. 10, 1978, Pat. No. 4,218,867.

[30] Foreign Application Priority Data

Oct. 7, 1977 [FR] France .................... 77 30788

[51] Int. Cl.³ ............... A01D 77/00; A01D 79/00
[52] U.S. Cl. .............................................. 56/370
[58] Field of Search .................... 56/12.7, 365-377

[56] References Cited

U.S. PATENT DOCUMENTS

| | | | |
|---|---|---|---|
| 3,295,302 | 1/1967 | Lee | 56/12.7 |
| 3,841,073 | 10/1974 | Lely | 56/370 |
| 4,128,987 | 12/1978 | Zweegers | 56/370 |
| 4,218,867 | 8/1980 | Kaetzel | 56/370 |

FOREIGN PATENT DOCUMENTS 160385  1/1955  Australia .................... 56/12.7

*Primary Examiner*—Robert A. Hafer
*Attorney, Agent, or Firm*—Young & Thompson

[57] ABSTRACT

A haymaking machine with at least one drum rotating about a substantially vertical axis and carrying flexible resilient elements of rubber or plastics in plate-like or bifurcated or various other forms and adapted to lift and impel cut fodder without the use of metal tines.

6 Claims, 7 Drawing Figures

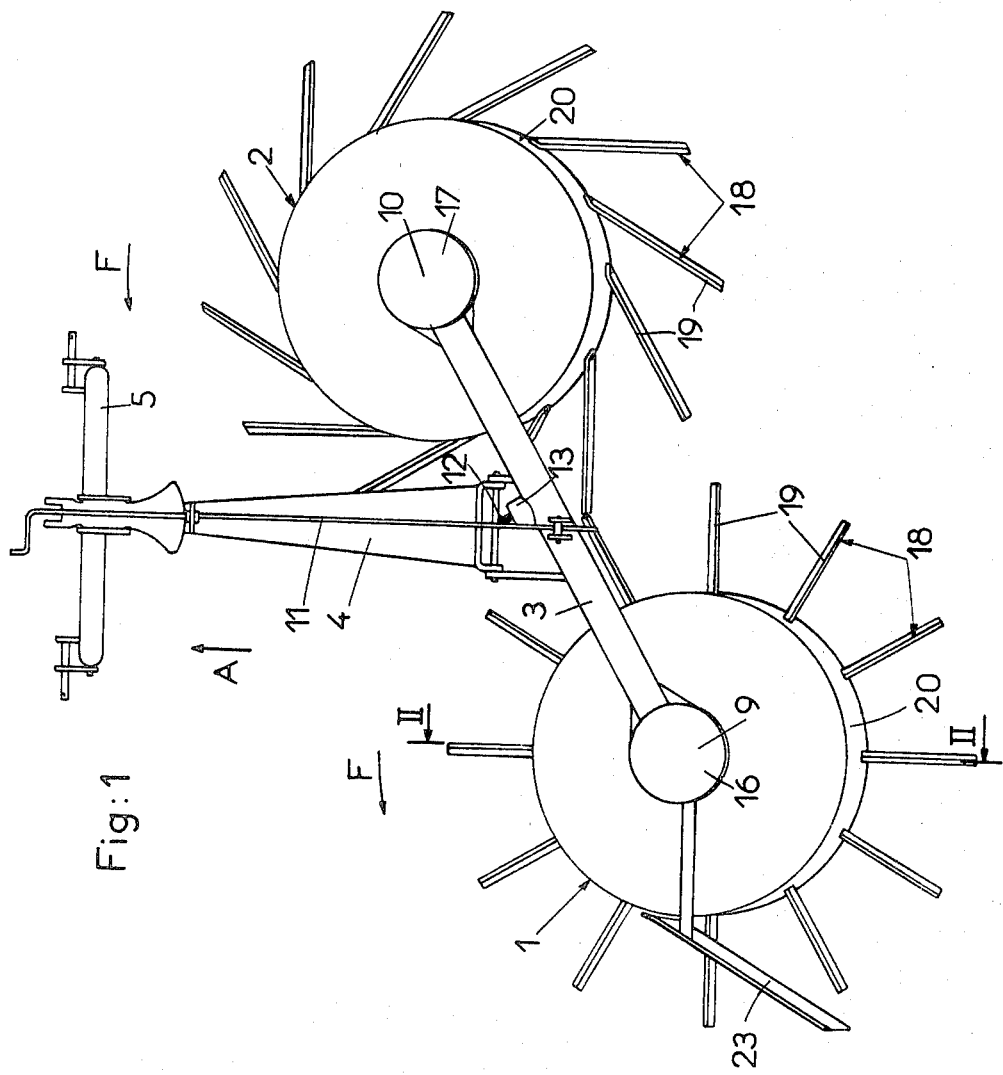

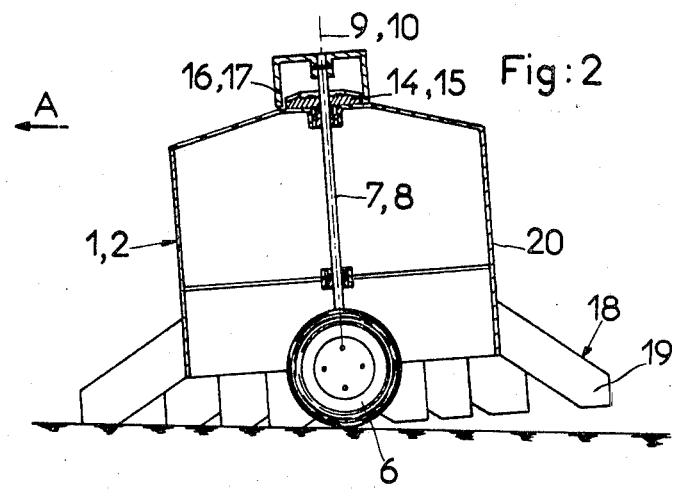
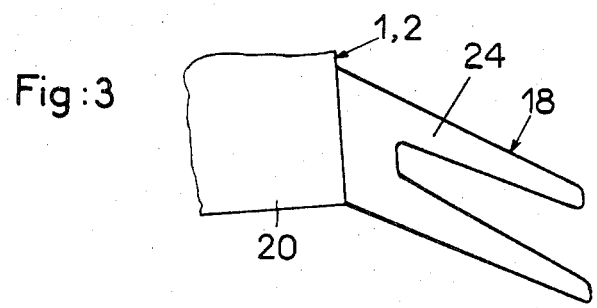
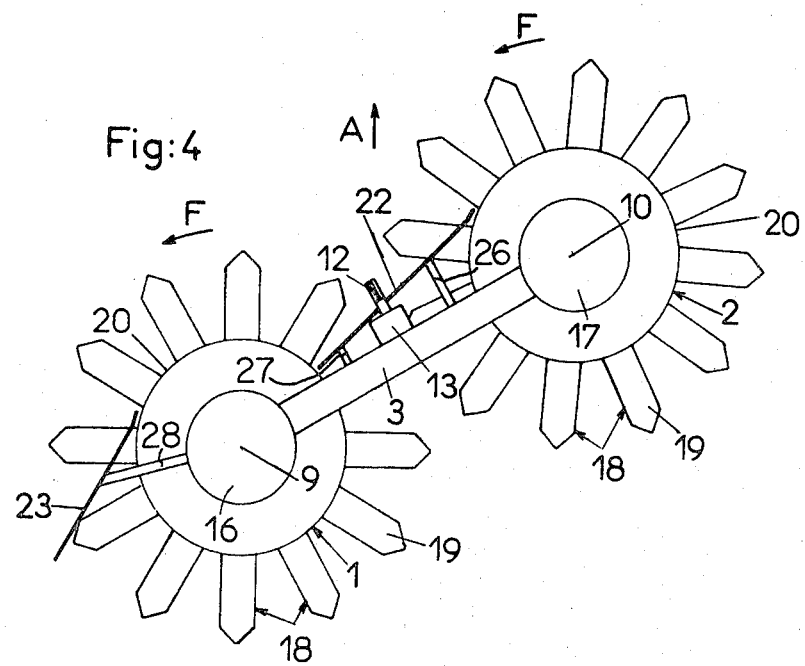

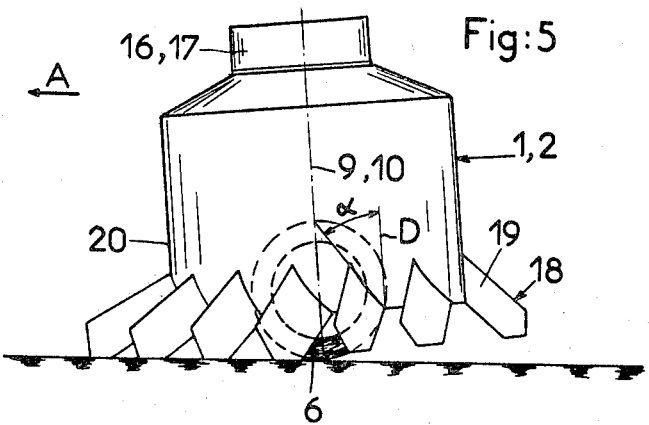
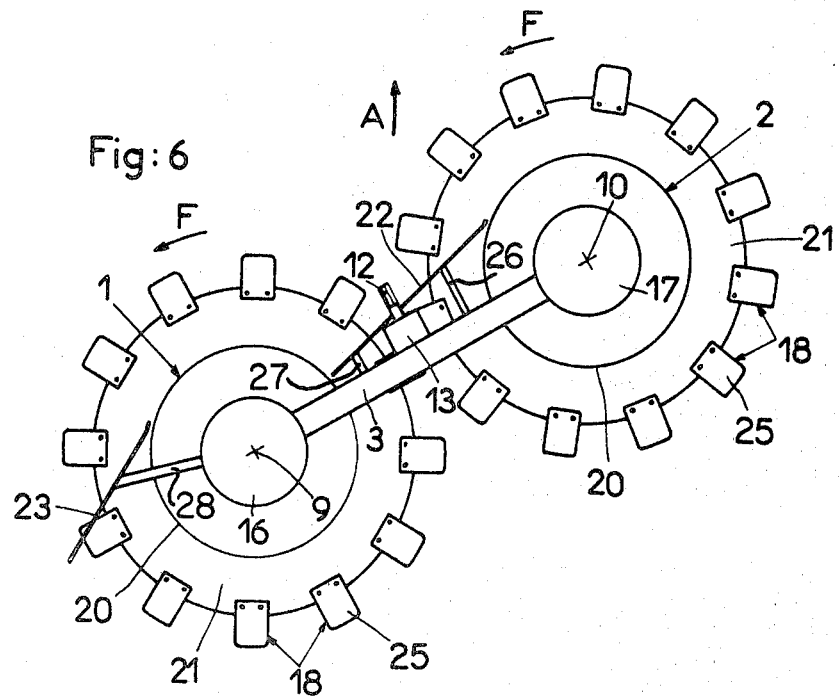
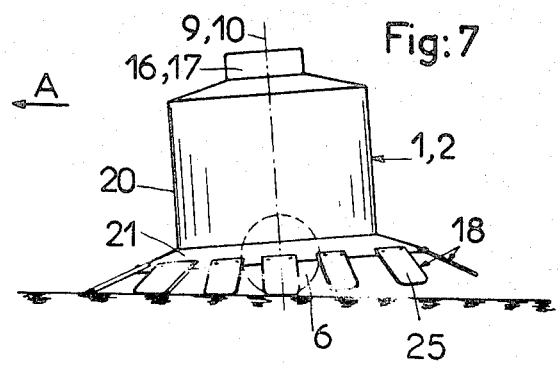

HAYMAKING MACHINE

The application is a continuation of application Ser. No. 146,198 filed Apr. 30, 1980 now abandoned, which is a division of Ser. No. 950,260, filed Oct. 10, 1978 now U.S. Pat. No. 4,218,867.

The present invention relates to a novel type of haymaking machine for the windrowing of fodder, the turning of windrows or for tedding, comprising at least one drum rotating about a substantially vertical or inclined axis.

Up to the present a very large number of types of haymaking machines for the above-mentioned tasks exists. These machines however possess one common characteristic: they possess metallic tines or the like elements of variable lengths. These tines, intended to displace the fodder, possess grave drawbacks.

The said tines can in fact be broken without the user being aware of this. In particular on machines having tines which extend radially and substantially parallel with the ground, it frequently occurs that the said tines dig themselves into the ground and break, if the user of the machine omits to cause the rotary rake heads to rotate, before progressing with the tractor. The broken tine is then lost in the fodder which is intended to be collected for example with the aid of a baler or a pick-up chopper. Now the passage of a broken tine into such a machine generally causes very significant damage, the repair of which is extremely lengthy and burdensome, and of course this happens at the precise moment when the user has an urgent need to bring his fodder in on time, while the meteorological conditions are favorable. Thus the tines of haymaking machines constitute a permanent danger for balers and pick-up choppers. Furthermore, these lost tines or pieces of tines are in danger of injuring the animals.

Despite all the precautions which may be taken, the said metallic tines of haymaking machines are still quite rough on the one hand towards the cut fodder and on the other towards young growth of vegetation. Now it is known that the more gently the fodder is treated, especially in windrowing, the more it retains its nutrient qualities and the better is the yield.

Furthermore, these tines generally drag the fodder over the ground during working. For this reason the said fodder is often soiled by the earth, which can cause its rejection by the animals.

Another known machine is provided with flexible plates situated entirely in vertical planes to displace the fodder. However, these plates displace the fodder squarely on the ground. This causes significant soiling which reduces the quality of the fodder and can further occasion losses of fodder as a result of its friction on the ground.

The present invention aims at remedying the above-stated drawbacks by proposing a machine as described in the introduction which presents no risk either for the machines or for the stock and furthermore treats the cut fodder and also young vegetation growth with extreme gentleness and causing no soiling of the fodder. To this end one important characteristic of the invention consists in that each drum of the machine carries at its base flexible and deformable plates of rubber or an analogous material which displace the fodder during working, the said plates being at least partially inclined so that they form a certain angle with a straight line parallel to the rotation axis of the corresponding drum. By virtue of their flexibility the said plates are not harsh either to the cut fodder or to the young vegetation growth. Moreover, by reason of the fact that these plates are deformable, there is practically no danger of breakage when they encounter an obstacle, and thus no risk of deterioration to machines such as balers or pick-up choppers. In the case where one of these plates or a part of these plates should nevertheless be lost in the fodder, their constitution would permit them to pass through a baler or a pick-up chopper without damaging these machines. Furthermore, by virtue of the inclination of the said plates, the fodder slides over them and they keep it out of contact with the ground during working. Thus, this fodder does not rub on the ground and remains free from soiling.

According to a further characteristic of the invention, the flexible and deformable plates extend in planes substantially perpendicular to the rotation axis of the corresponding drum. In this form of embodiment the said plates are advantageously attached to a crown constituting the base of the drum. Thus the said plates lift the fodder laid on the ground and this fodder can then pass over the crown of the corresponding drum so that it remains removed from the ground during working.

The machine according to the invention can advantageously comprise several drums carrying flexible and deformable plates, which drums can be placed side by side and slightly staggered towards the rear in relation to one another, especially for lateral windrowing. Moreover, between two adjacent drums there may be provided a deflector favoring the passage of the fodder from one drum to the other, and laterally of the drum placed rearmost there can be provided a deflector favoring the formation of a lateral windrow.

The invention will be explained in greater detail hereinafter with reference to several forms of embodiment which are illustrated by way of non-limitative example in the accompanying drawings, wherein:

FIG. 1 represents a plan view of a machine according to the invention;

FIG. 2 represents a section of a drum of the machine as illustrated in FIG. 1, along the section line II—II;

FIG. 3 represents, on a larger scale, a variant of embodiment of the flexible and deformable plates;

FIG. 4 represents a plan view of a variant of embodiment of a machine according to the invention;

FIG. 5 represents, on a larger scale, a side view of a drum of the machine as illustrated in FIG. 4;

FIG. 6 represents a plan view of another variant of embodiment of a machine according to the invention; and FIG. 7 represents a side view of a drum of the machine as illustrated in FIG. 6.

As represented in the accompanying drawings, the haymaking machine according to the invention comprises for example two substantially identical drums 1 and 2. These drums 1 and 2 are interconnected by a transverse support chassis 3. The latter is connected by means of a connection beam 4 extending forward to a three-point linkage device 5 permitting coupling of the machine to a propelling tractor (not shown). During working, the machine can move over the ground by means of small wheels 6 or skids, preferably placed beneath the drums 1 and 2.

The said drums 1 and 2 are preferably rigid and can be made of sheet metal or plastic material. Each drum 1, 2 is mounted freely in rotation on a central support spindle 7, 8, the lower extremity of which is connected to the aforementioned wheel 6 or skid. During working each drum 1, 2 is driven in rotation about a geometric axis 9, 10 which is substantially vertical or inclined forward, according to the nature of the work to be carried out. The said forward inclination of the drums 1, 2 can be adjusted by means of a threaded crank handle 11 which causes the transverse support chassis 3 to pivot in relation to the connection beam 4, when the handle is operated. The said rotating drive of the drums 1, 2 can be effected mechanically from the power take-off shaft of the tractor. For this purpose, the said shaft is connected by means of a Cardan shaft (not shown) to an intermediate shaft 12 extending into a gear box 13 of the transverse support chassis 3. The said intermediate shaft in turn, by means of bevel pinions lodged in the box 13, drives a longitudinal shaft which is preferably disposed in the transverse support chassis 3 and comprises at each of its extremities a bevel pinion which meshes with a toothed rim 14, 15 fast with the corresponding drum 1, 2. These bevel pinions and toothed rims are lodged in boxes 16 and 17 of the transverse support chassis 3 (FIGS. 1 and 2).

It is apparent that other means can be utilized to effect the rotating drive of the drums 1 and 2 without thereby departing from the scope of the invention. For example, the said drums can equally be driven in rotation by the ground. In this case each drum 1, 2 would possess a zone of contact with the said ground, by virtue of which the displacement of the machine in its direction A of travel would cause the rotation of the said drums.

Each drum 1, 2 carries at its base flexible and deformable elements 18 of rubber or an analogous material such as plastics material which displace the fodder during working. These elements 18 are constituted by plates 19 of elongated form which are independent of one another. They extend outwards and substantially downwards from the wall 20 of the corresponding drum 1, 2. The said plates can be attached to the walls 20 of the drums 1 and 2 for example by fluing, riveting, screwing or even in an easily removable manner by the use of a kind of press stud or the like.

The machine according to the invention thus does not possess the drawbacks cited in the introduction, of the haymaking machines equipped with metallic tines for working the fodder.

In order that the flexible and deformable plates 19 may suitably grasp the fodder laid on the ground, their external part can be cut in a pointed form with one of the sides parallel to the ground (FIG. 2). With this same purpose, the said plates can likewise be cut in the form of forks in accordance with the example of embodiment as illustrated in FIG. 3. Moreover, these flexible and deformable plates 19 may comprise reinforcements in order to increase their wear resistance. These reinforcements may be constituted in a manner known per se by braided wires which are embedded in the said plates.

In the example of embodiment as represented on the drum 1 of the machine as illustrated in FIG. 1, the flexible and deformable plates 19 extend radially. In this position the said plates have a good grasp over the fodder. They thus displace the said fodder over a large sector of their trajectory and can even cause turning of the fodder.

In the example of embodiment as represented on the drum 2 in the machine as illustrated in FIG. 1, the flexible and deformable plates 19 are oriented in the direction opposite to the rotation direction of the said drum 2 as indicated by the arrow F. In this case the said plates have a gentle incidence upon the fodder and the latter can easily disengage itself from the said plates on the lateral part of the drum 2.

From these two examples of embodiment it appears that the position of the flexible and deformable plates 19 has a great influence upon their manner of working. Thus, the position as represented on the drum 1 can be preferred for tedding or for the turning of windrows while the position as represented on the drum 2, where the plates 19 displace the fodder more gently, can advantageously be selected for the formation of the windrow. Moreover, in order that the flexible and deformable plates 19 of one and the same machine can be perfectly well adapted to different tasks such as windrowing, windrow turning or tedding, means can be provided which permit of adjusting the positions of the said plates. For this purpose these plates may for example be fixed upon orientable supports articulated on the drums 1, 2. The fact that these plates are flexible and deformable may likewise be exploited for the modification of their position. Thus they can be folded in the direction opposite to the rotation direction F of the corresponding drum 1, 2 and held in this position by means of a stop, in order to bring them from a position as represented on the drum 1 into a position as represented on the drum 2.

In accordance with an important characteristic of the invention, the flexible and deformable plates 19 are at least partially inclined so that they form an angle $\alpha$ with a straight line D parallel to the rotation axis 9, 10 of the corresponding drum 1, 2 (FIG. 5). These plates 19 can form substantially the same angle $\alpha$ over their entire length or can be twisted so as to form a greater angle $\alpha$ at one of their extremities than at the other. This inclination permits the fodder to slide over the flexible and deformable plates 19 which keep it remote from the ground during its displacement. The fodder thus displaced is not soiled by the earth, which is a factor of good quality. Moreover, this avoids losses of fodder which could be caused by friction on the ground.

In the example of embodiment as represented in FIGS. 6 and 7, the flexible and deformable plates 19 extend in planes substantially perpendicular to the rotation axis 9, 10 of the corresponding drum 1, 2. In this case the said plates 19 are attached to a crown 21 of substantially frusto-conical form which constitutes the base of the drums 1,2. Thus the said flexible and deformable plates 19 lift the fodder laid on the ground. Then this fodder passes over the crown 21 and is transported by the latter so that it remains remote from the ground during working.

For lateral windrowing the drums 1, 2 according to the invention are placed side by side and preferably staggered in relation to one another towards the rear (FIGS. 1, 4 and 6). In this position the said drums 1, 2 are driven in the same rotation direction F. Thus the fodder is transferred from one drum to the other and deposited in the form of a windrow laterally of the machine. By virtue of the above-mentioned staggering of the drums 1, 2 the trajectories described by their flexible and deformable plates 19 partially overlap, in order to avoid losses of fodder between the said drums. With this same purpose a deflector 22 is disposed between the two adjacent drums 1, 2. This deflector closes the space existing between the two adjacent drums 1, 2 and favors the passage of the fodder from one drum to the other. Laterally of the rearmost drum 1 there is disposed a deflector 23 which favors the formation of a windrow. This lateral deflector 23 intercepts the fodder displaced by the drum 1 so that this fodder is deposited in the form of a regular windrow.

For tedding the two drums 1, 2 can be placed side by side in a plane substantially perpendicular to the direction A of travel of the machine. Moreover, the said drums can be driven so that they rotate to converge at the front, so that they spread the fodder in the zone situated behind the machine.

Without departing from the scope of the invention it is possible to place the above-described windrowing drums at the front or rear of a machine intended to harvest fodder such for example as a self-loader, a pick-up chopper, a baler, a mower or a mower-conditioner, especially with the purpose of reducing the width of a windrow of mown fodder.

Although the accompanying drawings represent machines comprising two drums it is apparent that the number of drums can be modified and their form can be varied, as also can the relative position, without departing from the scope of the invention. Likewise it will of course also be possible to effect various modifications, improvements or additions to the different variants of embodiment as described, without thereby departing from the scope of the invention.

What is claimed is:

1. A haymaking machine for the windrowing of fodder, the turning of windrows or for tedding, comprising:
   at least one drum rotating about a substantially vertical axis, and
   flexible and deformable plates of rubber fixed to the lower part of the drum,
   said plates being elongated and having upper and lower longitudinal edges and inner and outer ends, said plates being inclined from their upper to their lower edges downwardly and forwardly in the direction of rotation of the drum, said plates being inclined downwardly from their inner ends to their outer ends, and said plates when viewed from above extending radially outwardly or being inclined rearwardly from the direction of rotation of the drum.

2. A haymaking machine as claimed in claim 1, in which the lower outer end of each said plate is pointed and one of the pointed sides is substantially parallel to the ground.

3. A haymaking machine as claimed in claim 1, in which each said plate is forked.

4. A haymaking machine as claimed in claim 1, there being a pair of said drums disposed side by side and staggered toward the rear one relative to the other.

5. A haymaking machine as claimed in claim 4, and a deflector disposed between said drums to deflect fodder from the forward drum to the rear drum.

6. A haymaking machine as claimed in claim 4, and a lateral deflector immediately adjacent the wall of the rearmost drum to favor the formation of a windrow.

* * * * *